Figure 1:
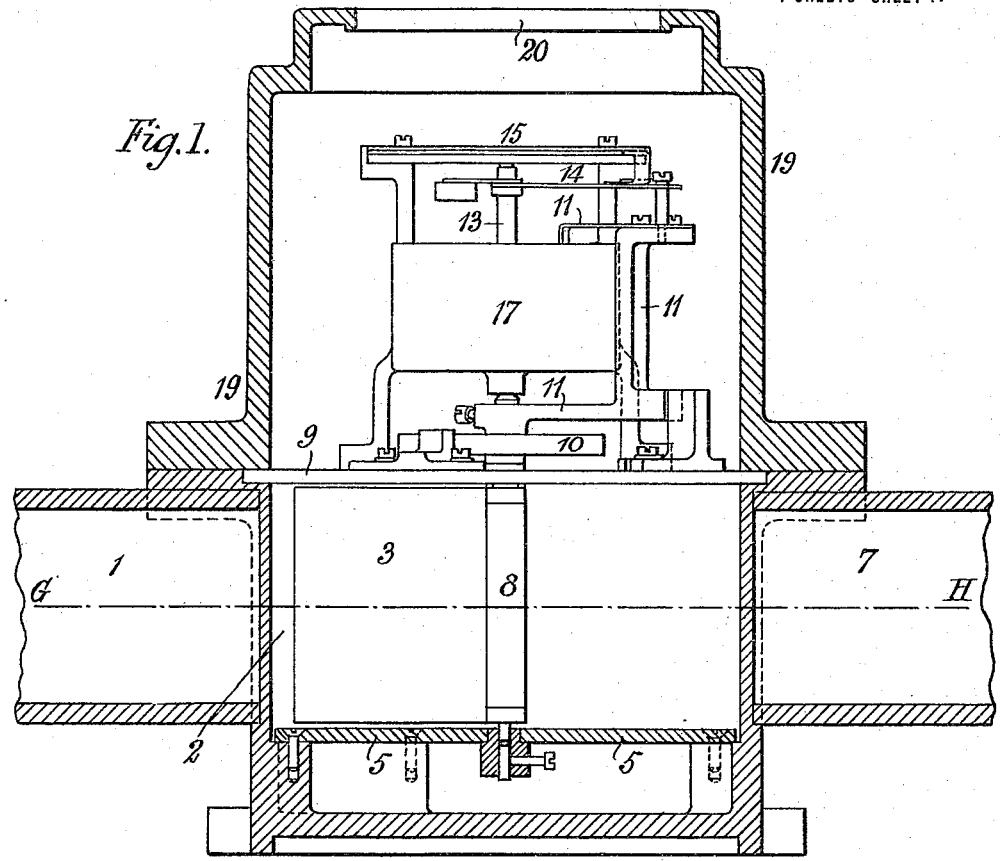

J. L. HODGSON & F. GRAY.
FLUID METER.
APPLICATION FILED JAN. 31, 1916.

1,188,175.

Patented June 20, 1916.
4 SHEETS—SHEET 1.

Inventors:
J. L. Hodgson & Ffolliott Gray
By their attorneys
Baldwin & Wight

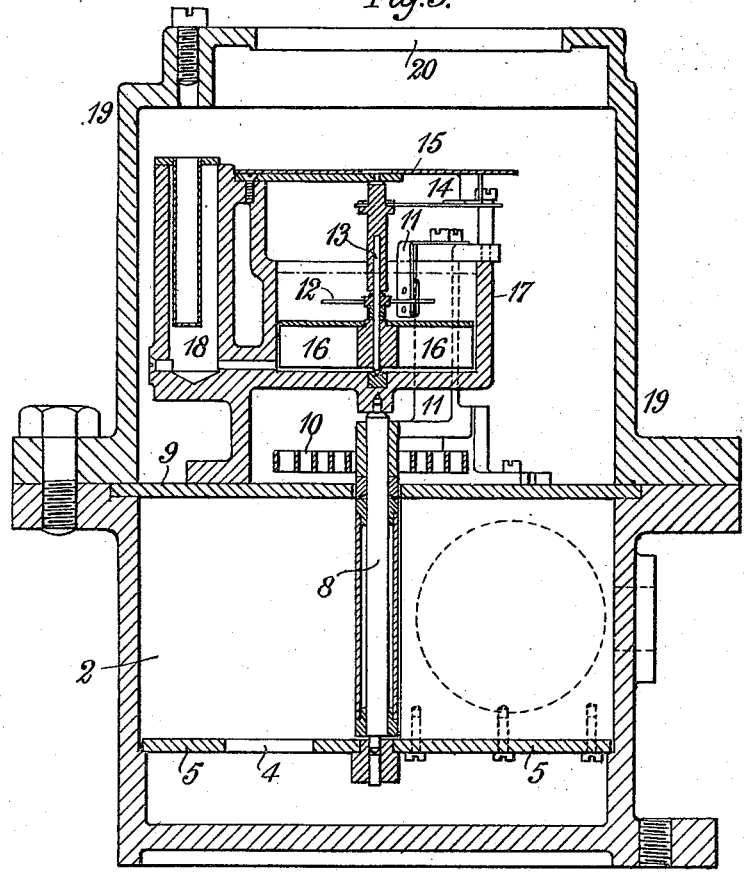
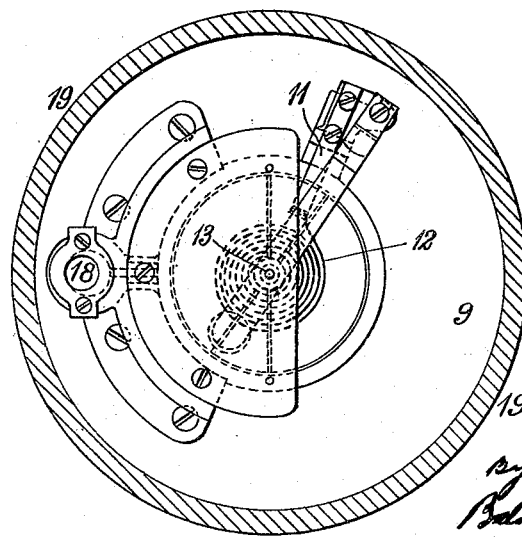

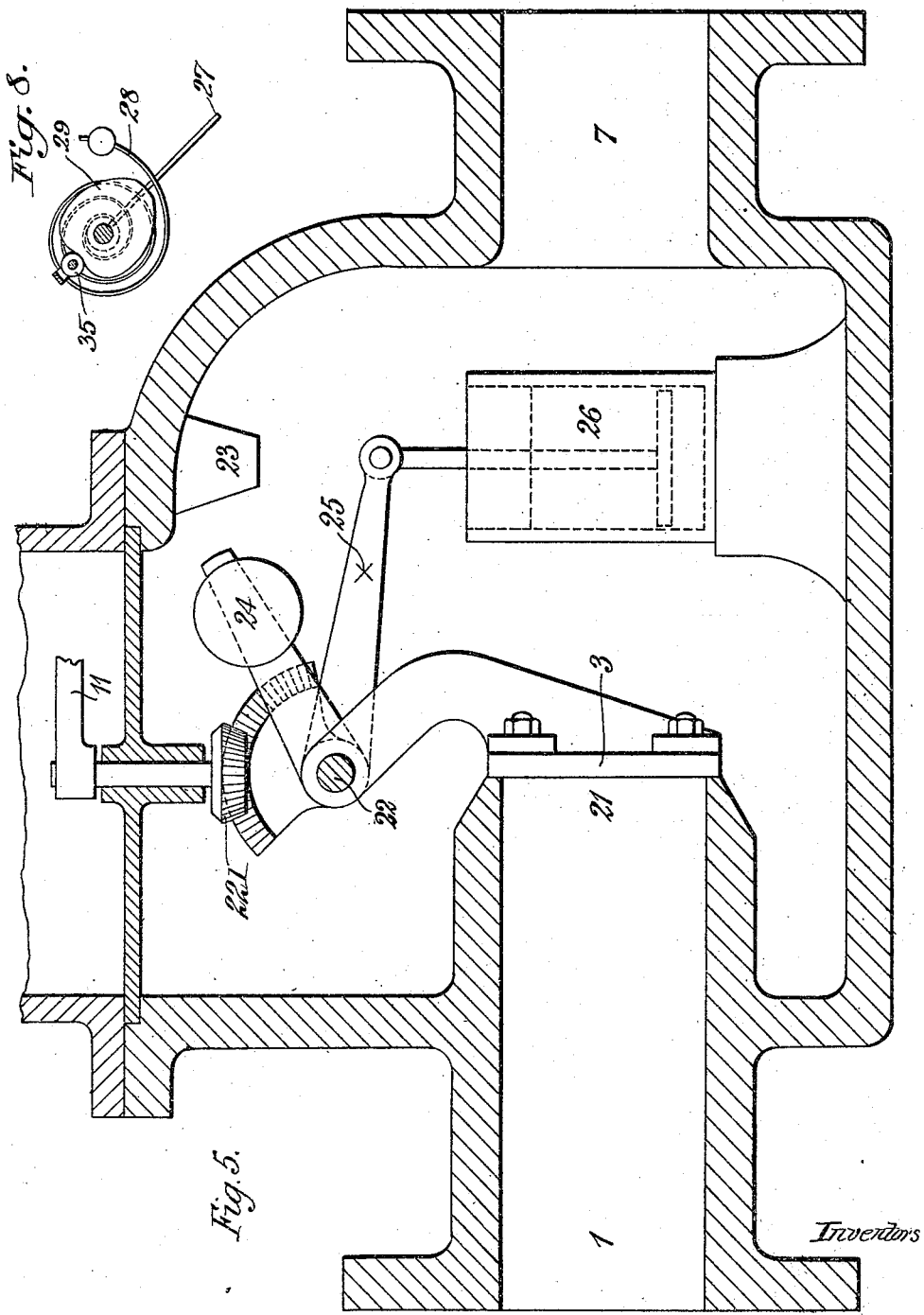

J. L. HODGSON & F. GRAY.
FLUID METER.
APPLICATION FILED JAN. 31, 1916.
1,188,175.
Patented June 20, 1916.
4 SHEETS—SHEET 4.
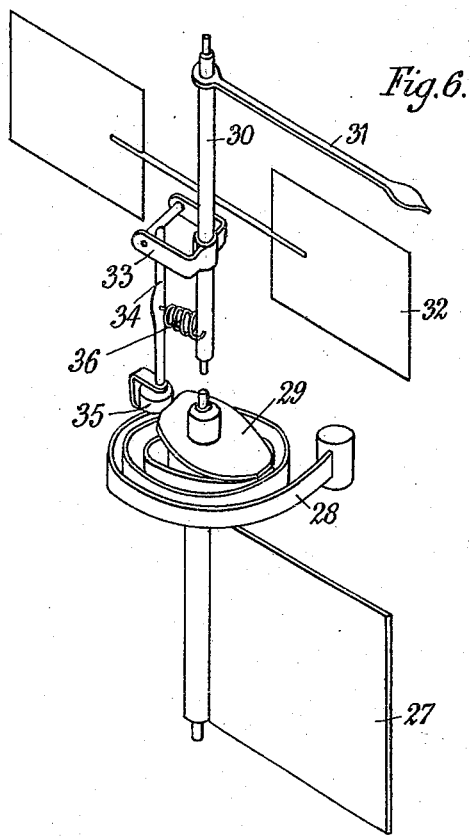
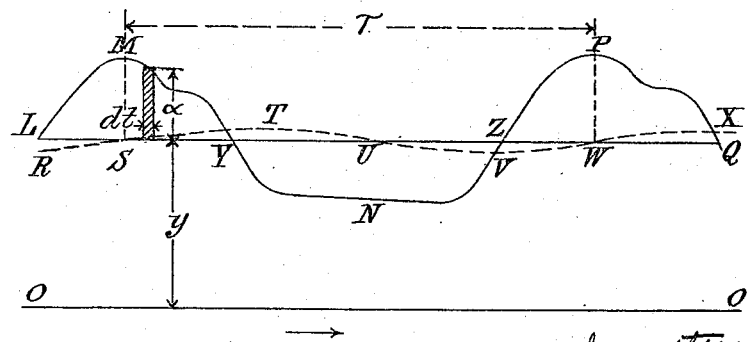

UNITED STATES PATENT OFFICE.

JOHN LAWRENCE HODGSON AND FFOLLIOTT GRAY, OF LONDON, ENGLAND, ASSIGNORS TO GEORGE KENT, LIMITED, OF LONDON, ENGLAND.

FLUID-METER.

1,188,175.  Specification of Letters Patent.  Patented June 20, 1916.

Application filed January 31, 1916. Serial No. 75,438.

*To all whom it may concern:*

Be it known that we, JOHN LAWRENCE HODGSON and FFOLLIOTT GRAY, subjects of the King of Great Britain, and both residents of 199 to 201 High Holborn, London, England, have invented new and useful Improvements in Fluid-Meters, of which the following is a specification.

The object of this invention is to provide a simple means for measuring a periodic pulsating flow, but our meter is of course equally applicable to the measurement of steady flows.

Our invention relates to meters of the type in which the measurement is obtained from the movements of a hinged flap which is moved by the passage of the fluid to be measured. The flap may be loaded by a weight, but is preferably loaded by a spring or springs, since it is desirable when measuring rapidly pulsating flows to reduce the inertia of the moving parts to a minimum.

According to our invention we arrange that the relation between the loading of the flap and the discharge area opened up is such that the movement of the flap is proportional or substantially so to the flow throughout the entire range of the meter, and we insert between the flap and the indicating mechanism a spring or other flexible coupling. The displacement of the flap being approximately proportional to the flow at every instant, the meter will give a correct indication of a pulsating flow (that is, of its mean value throughout a number of complete cycles) whatever be its wave form, if the following condition is complied with: *i. e.*, if the coupling is so made that the force exerted when its parts are relatively displaced varies according to a law which is so related to the law of damping, that for any relative displacement of the two parts of the coupling the rate of motion of the pointer is proportional to the amount of this relative displacement. Thus, if the pointer is damped in such a way that its rate of movement is proportional to the $n^{\text{th}}$ root of the applied force, then the flexible coupling must be so designed that the force applied by it to the pointer is proportional to the $n^{\text{th}}$ power of the relative displacement between the two parts of the coupling. This condition is very easily fulfilled by damping the motion of the pointer by means of vanes immersed in oil, in which case the resulting rate of movement (owing to the viscous resistance of the oil) is proportional to the applied force ($n$ being equal to unity) and transmitting the motion of the flap to the pointer by means of a spring, which makes the applied force proportional to the movement ($n$ being unity in this case also). If the law of damping in any other case is such that the rate of movement is not proportional to the applied force, as *e. g.* if the pointer is damped by a fan revolving in air or in a mobile liquid (in which case the rate of movement will be proportional to the square root of the applied force) some other form of coupling must be used, such as that described hereafter.

Figure 2:
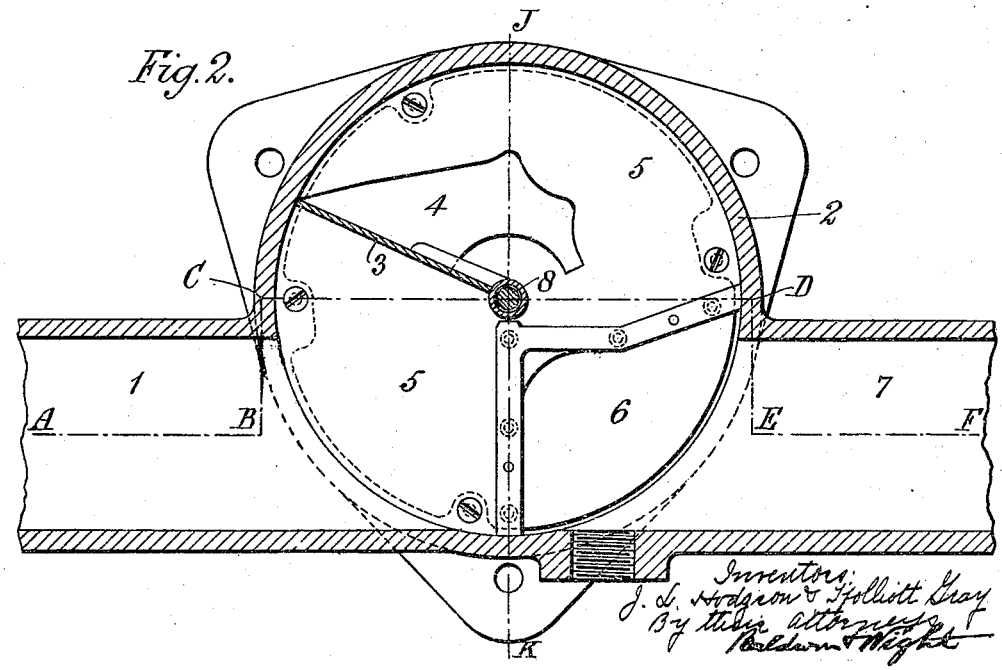

Our invention is illustrated by the accompanying drawings, Figure 1 of which is a vertical section on the line ABCDEF of Fig. 2 which is a section on the line GH of Fig. 1; Fig. 3 is a section on the line JK of Fig. 2, Fig. 4 is a sectional plan with parts removed, Figs. 5 and 6 show modifications, and Fig. 7 is an explanatory diagram. Fig. 8 is a detail view of part of the mechanism shown in Fig. 6.

That the pointer will give a correct indication of the true mean flow when the condition enunciated above is fulfilled is proved as follows: Let OO, Fig. 7, represent the zero line. Let LMNPQ represent the periodic fluctuation of the rate of flow plotted on a time base. Then since the displacement of the gate is at each instant made proportional to the quantity passing, LMNPQ will also represent the motion of the gate to a different vertical scale. Let RSTUVWX represent the corresponding motion of the damped pointer. Let us damp the pointer heavily so that we make no sensible error in assuming that the lines RSTUVWX and LSYUZWQ are coincident. Let $\alpha$ be the angular displacement between the damped pointer and the gate at any instant.

In the meter considered, the damped pointer is connected to the gate by means of a flexible coupling. The force exerted by this coupling on the damped pointer at any instant is obviously some function of $\alpha$. The damped pointer, when it starts to move under the influence of this force, will find its motion retarded by another force which is a function of its velocity. This resisting force will vary directly as the velocity, if the damping is due to viscous resistance, or as the square of the velocity, if the damping is due to fluid resistance; or generally, it will vary as the $n^{th}$ power of the velocity. Now in every case, whatever be the law of damping of the pointer (*i. e.* the value of $n$) the flexible coupling is designed so that the force applied bears such a relation to the law of damping that the velocity of the damped pointer is proportional to $\alpha$. This being the case, its motion in time $dt$ is $$k\alpha dt$$

where $k$ is a constant.

If T be the time of one complete cycle, say the distance SW, then the net motion of the damped pointer during this time will be $$\Sigma_0^T k\alpha dt = k\Sigma_0^T \alpha dt$$

But this is zero, since the pointer, when it has taken up its mean position wherever that may be, will always be at the same distance $y$ from OO at the commencement and end of each complete cycle. Therefore if the velocity of the damped pointer is made proportional to $\alpha$, it will take up a position such that $$k\Sigma_0^T \alpha dt = 0$$

*i. e.* such that $$\Sigma_0^T \alpha dt = 0$$

for one complete cycle. But $$\Sigma_0^T \alpha dt$$

represents the algebraic sum of the areas SMY, YNZ and ZWP measured about the line LSYUZWQ. That is the areas $$SMY + ZWP = YNZ,$$

and the line LSYUZWQ which represents the mean position of the pointer is the line which also represents the mean flow.

In Fig. 1, 1 is an inlet pipe introducing fluid to a cylindrical chamber 2 at the axis of which is hinged a flap or gate 3 which on being rotated clockwise by the pressure of the fluid uncovers an orifice 4 in the bottom plate 5. This orifice leads to a chamber 6 in communication with the outlet pipe 7 and is so shaped that the movement of the flap is proportional to the flow or substantially so. The spindle 8 of the flap passes out through the cover plate 9 of the chamber 2 and is connected to the inner end of a spiral spring 10 the outer end of which is fixed; this spring determines the position of the flap for a given flow. Fast on the spindle 8 is an arm 11 which is bent upward, inward and downward and is attached to the outer end of a hair spring 12, the inner end of which is connected to an arbor 13 carrying a pointer 14 which moves beneath a transparent scale 15. The arbor 13 carries vanes 16 which move in a cup 17 to which oil can be supplied through a pipe 18. The whole is inclosed in a pressure tight casing 19 provided with a glazed window 20 through which the position of the pointer can be read. The weight of the flap is balanced by the arm 11 so that the reading of the instrument is unaffected if it is slightly out of level. Alternatively, the motion of the flap spindle 8 may be transmitted to a cam such as 29. In this device the flap is free to oscillate beyond the zero or the maximum position, being inclosed in a cylindrical cavity. Its zero position is determined by the spiral spring 10, there being no stress on the spring when the flap is at zero. The stress on the spring is proportional to the movement, and the fall of pressure across the flap therefore increases with the movement and since the motion of the flap has to be proportional to the flow, the increment of the discharge area opened up will diminish with each equal increment of motion of the flap.

In the modification shown in Fig. 5, a flap 3 which is perfectly flat and circular closes an orifice 21 in the pipe 1. The plane of the flap preferably passes through the axis of the hinge 22 about which the flap moves. The flap is capable of making an angular movement of some 20° or 30°, this maximum opening being limited by a stop 23. The motion of the flap is controlled by a weight 24 arranged in such a way as to give a practically constant closing force, *i. e.* the center of gravity 25 of all the parts moving about the hinge 22 should move as nearly as possible in a vertical line. Under the above conditions the motion of the flap is practically proportional to the flow, and the true mean of a pulsating flow can be obtained by transmitting this motion by means of bevel gears 221 or other suitable arrangements to an arm 11 which transmits the motion proportional to the flow to a damped pointer spindle as shown in Figs. 1, 3 and 4.

When employing the method shown in Fig. 5, it is necessary to fit a dash-pot 26 in order to damp out the small rapid oscillations which otherwise occur when the flow is small in a device of this type. The damping due to the dash-pot should not, however, be powerful enough to prevent the plate from following each variation in the flow, even when these are rapid. If this arrangement be used for measuring a liquid the dashpot is preferably filled with that liquid.

Fig. 6 shows as a modification an arrangement in which is employed a flexible coupling which can be made to suit any specified law of damping. In this figure 27 represents a gate arranged to be pivoted in a cylindrical chamber and moved by the flow of air in a similar manner to the gate 3 in Figs. 1 and 2, its motion being controlled by the spring 28. The spindle of this gate also carries a heart-shaped cam 29. A separate spindle 30 carries the indicating pointer 31, the damping vanes 32 (which are arranged to move in air or in a mobile liquid), and lastly a forked bracket 33 in which is hinged a rod 34. At the extremity of this rod is a roller 35, which roller is pressed in contact with the edge of the cam 29 by the action of a spring 36. The flexible coupling between the two spindles thus consists of the cam 29, roller 35, arm 34, and bracket 33. The cam 29 is so shaped that when the roller is displaced from the point of minimum radius of the cam (resulting from a relative displacement of the gate spindle and pointer spindle) the resulting rotational effort on the spindle 30 is of such a magnitude that the rate of movement of the pointer is proportional to the relative displacement of the spindles—the condition necessary to make the pointer register the true mean flow.

What we claim is:—

1. In a fluid meter, a casing having an outlet, a member controlled by the flow through the meter and adapted to open up more or less of said outlet, the outlet being so shaped that the displacement of said member is at every instant proportional to the flow through said outlet, a pointer, means for damping the movements of the pointer, and a yielding and resilient connection between the member and the pointer, which connection is adapted to cause the rate of movement of the pointer at any instant to be proportional to the relative displacement of the pointer and said member.

2. In a fluid meter the combination of a member controlled by the fluid impinging thereon whose displacement at every instant is as nearly as possible proportional to the flow, a cam operated by the movement of said member, a pointer, means for damping the movement of the pointer, and a roller carried by the pointer and adapted to be actuated by the cam to thereby actuate the pointer.

3. In a fluid meter having a discharge orifice, the combination of a loaded flap adapted to open up the discharge orifice, a hair spring having one end connected to the flap, a pointer connected to the other end of the hair spring, and means for damping the movements of the pointer.

4. In a fluid meter having a discharge orifice, the combination of a loaded flap adapted to open up the discharge orifice, a hair spring having one end connected to the flap, a pointer connected to the other end of the hair spring, a receptacle containing liquid, and vanes fast with the pointer and submerged in the liquid.

5. In a fluid meter having a discharge orifice, the combination of a flap adapted to open up the discharge orifice, a spring adapted to resist the movement of the flap as it opens the orifice, a hair spring having one end connected to the flap, a pointer connected to the other end of the hair spring, and means for damping the movements of the pointer.

6. In a fluid meter having a discharge orifice, the combination of a spindle, a loaded flap fast on the spindle and adapted to open up the discharge orifice, a cam fast on the spindle, a second spindle, a pointer carried thereby, a receptacle containing liquid, vanes fast on the second spindle and submerged in the liquid, and means whereby the rotation of the cam effects the rotation of the second spindle.

7. In a fluid meter a casing having an outlet, a member controlled by the flow through the meter and adapted to open up more or less of said outlet, the outlet being so shaped that the displacement of said member is at every instant proportional to the flow through said outlet, a receptacle containing viscous liquid, a pointer, vanes fast on the pointer, and submerged in the liquid, and a hair spring having one end connected to the member and the other to the pointer.

JOHN LAWRENCE HODGSON.
FFOLLIOTT GRAY.